(12) United States Patent
Shantharam et al.

(10) Patent No.: US 11,751,260 B2
(45) Date of Patent: Sep. 5, 2023

(54) APPARATUS AND METHOD OF IDENTIFYING FOR PAIRING ONE OR MORE DEVICES WITH A MASTER DEVICE

(71) Applicant: KAHA PTE. LTD., Singapore (SG)

(72) Inventors: Sudheendra Shantharam, Bengaluru (IN); Prashant Adkoli, Bengaluru (IN)

( * ) Notice: Subject to any disclaimer, the term of this patent is extended or adjusted under 35 U.S.C. 154(b) by 339 days.

(21) Appl. No.: 16/625,787

(22) PCT Filed: Jun. 25, 2018

(86) PCT No.: PCT/SG2018/050308
§ 371 (c)(1),
(2) Date: Dec. 23, 2019

(87) PCT Pub. No.: WO2018/236291
PCT Pub. Date: Dec. 27, 2018

(65) Prior Publication Data
US 2020/0128594 A1  Apr. 23, 2020

(30) Foreign Application Priority Data

Jun. 24, 2017 (IN) .............................. 201711022236

(51) Int. Cl.
| | |
|---|---|
| *H04W 76/11* | (2018.01) |
| *G05B 15/02* | (2006.01) |
| *G06F 3/01* | (2006.01) |
| *H04M 1/72412* | (2021.01) |
| *H04W 76/30* | (2018.01) |
| *H04W 76/14* | (2018.01) |

(52) U.S. Cl.
CPC ............. *H04W 76/11* (2018.02); *G05B 15/02* (2013.01); *G06F 3/017* (2013.01); *H04M 1/72412* (2021.01); *H04W 76/14* (2018.02); *H04W 76/30* (2018.02)

(58) Field of Classification Search
None
See application file for complete search history.

(56) References Cited

U.S. PATENT DOCUMENTS

| | | |
|---|---|---|
| 9,520,100 B2 | 12/2016 | Houjou et al. |
| 9,946,457 B2 | 4/2018 | Warren |
| 10,416,712 B2 | 9/2019 | Brawer |

(Continued)

FOREIGN PATENT DOCUMENTS

| | | |
|---|---|---|
| CN | 104717762 A | 6/2015 |
| CN | 106211355 A | 12/2016 |
| WO | 2015/173653 A2 | 11/2015 |

*Primary Examiner* — Charles E Anya

(57) ABSTRACT

An apparatus and method for establishing a pairing between a mobile device and a smart wearable device is provided. The method includes generating and assigning a unique code for each of the detected plurality of smart wearable devices respectively. The unique code is shared with all the connected smart devices/devices in the communicative range of the mobile device. The smart devices (having a display) receive the corresponding unique codes and display the code on their respective displays. A request to establish a pairing connection is generated in response to an activity of a user in respect of the at least one smart wearable device and a communication is established between the at least one smart wearable device and the mobile device displaying the same unique code.

6 Claims, 6 Drawing Sheets

(56) References Cited

U.S. PATENT DOCUMENTS

| | | | |
|---|---|---|---|
| 2012/0317024 A1 | 12/2012 | Rahman et al. | |
| 2014/0046664 A1* | 2/2014 | Sarkar | H04L 63/0861 |
| | | | 704/E17.003 |
| 2014/0347289 A1* | 11/2014 | Suh | G06F 3/017 |
| | | | 345/173 |
| 2015/0168921 A1* | 6/2015 | Lee | G04G 9/0005 |
| | | | 368/243 |
| 2015/0208141 A1* | 7/2015 | Kim | G08C 17/02 |
| | | | 340/870.07 |
| 2016/0094990 A1* | 3/2016 | Witherspoon | H04L 63/18 |
| | | | 713/171 |
| 2016/0117076 A1* | 4/2016 | Kim | H04M 1/724 |
| | | | 715/735 |
| 2016/0150350 A1* | 5/2016 | Ingale | H04W 12/33 |
| | | | 370/255 |
| 2017/0124362 A1* | 5/2017 | Sheng | H04W 12/08 |

* cited by examiner

APPARATUS AND METHOD OF IDENTIFYING FOR PAIRING ONE OR MORE DEVICES WITH A MASTER DEVICE

FIELD OF THE INVENTION

The present invention generally relates to controlling of smart devices and in particularly relates to methods and apparatuses of identifying for pairing one or more devices with a master device.

BACKGROUND OF THE INVENTION

Smart devices forming an Internet of Things (IoT) are available in various form factors. Some of the common form factors include watches and wristbands. Most of these smart devices need to connect to a master device having graphical user interface (GUI) such as a smart phone, to make use of complete set of features of the smart device.

Nowadays, users generally possess numerous smart devices and more than one smart device having same form factor, for example three smart watches. These smart watches may further be of the same manufacturer and/or model. Each of such smart devices having same form factor, when connected with the master device is displayed on the GUI as a graphic such as a text or icon that is generic. For example, three smart watches of the same manufacturer and/or model may be displayed on the GUI with text "Watch_1234". The problem further increases when details of a plurality of smart devices of more than one form to be connected are displayed. For instance, when there are three watches and two fitness bands having similar names respectively (for example, watch_022, watch_8823 and watch_0282, band_652, band_236). In such instances, identifying for pairing a particular smart device from among the smart devices having the same form factor, for example connecting one particular smart watch from among the aforementioned three smart watches, is a challenge.

Similarly, the problem arises when the user wishes to disconnect one smart device amongst the paired smart devices having similar name and form. For instance, in the above example, if there are three watches and two fitness bands having similar names respectively, and the user wishes to unpair one of the paired smart devices, the user will not know which device to be disconnected at this moment.

Thus, it is difficult for the user to pair or unpair with one or more smart devices bearing similar name and type in IoT environment. Therefore, there is a need in the art for an apparatus and method of identifying for pairing one or more devices having same form factor with a master device within an IoT environment.

SUMMARY OF THE INVENTION

The present invention is directed towards controlling, and in particularly, pairing and unpairing of a smart IoT device that substantially obviates one or more problems due to limitations and disadvantages of the related art.

In an embodiment, a method for establishing a pairing between a mobile device and a smart wearable device is provided. The method includes the steps of: receiving a unique code at the smart wearable device upon detection of the smart wearable device amongst a plurality of smart wearable devices detected within a communicative range of the mobile device over a communication network; generating a visual representation corresponding to the unique code, wherein the unique code facilitates in selection of the smart wearable device amongst the plurality of smart wearable devices detected within the communicative range of the mobile device over the communication network; receiving an activity response from a user in respect of the smart wearable device receiving the unique code; generating a request to establish a pairing connection with the mobile device in view of the received activity response from the user; transmitting the request to establish the pairing connection with the mobile device, wherein the request to establish the pairing connection includes the received unique code that facilitates in identification of the smart wearable device in a list of plurality of detected smart wearable devices displayed on the mobile device; and establishing the pairing connection between the smart wearable device and the mobile device upon receiving an input of the user regarding selection of the smart wearable device, linked with the unique code as included contained in the request, from the list of the plurality of detected smart wearable devices displayed on the mobile device.

In another embodiment, an apparatus for establishing a pairing between a mobile device and a smart wearable device is provided. The apparatus includes a receiving unit for receiving a unique code at the smart wearable device upon detection of the smart wearable device amongst a plurality of smart wearable devices detected within a communicative range of the mobile device over a communication network; a triggering unit for triggering one or more visual representation generating means for generating a visual representation corresponding to the unique code, wherein the unique code facilitates in selection of the smart wearable device amongst the plurality of smart wearable devices detected within the communicative range of the mobile device over the communication network; an input interface for receiving an activity response from a user in respect of the smart wearable device receiving the unique code; a controller for generating a request to establish a pairing connection with the mobile device in view of the received activity response from the user; a transmitting unit for transmitting the request to establish the pairing connection with the mobile device, wherein the request to establish the pairing connection includes the received unique code that facilitates in identification of the smart wearable device in a list of plurality of detected smart wearable devices displayed on the mobile device; and a communication means for establishing the pairing connection between the smart wearable device and the mobile device upon receiving an input of the user regarding selection of the smart wearable device, linked with the unique code as included contained in the request, from the list of the plurality of detected smart wearable devices displayed on the mobile device.

An object of the invention to provide apparatus and method of identifying for pairing one or more devices having same or similar form factor with a master device within an IoT environment.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF FIGURES

These and other features, aspects, and advantages of the present invention will become better understood when the following detailed description is read with reference to the accompanying drawings in which like characters represent like parts throughout the drawings, wherein.

Figure 1:
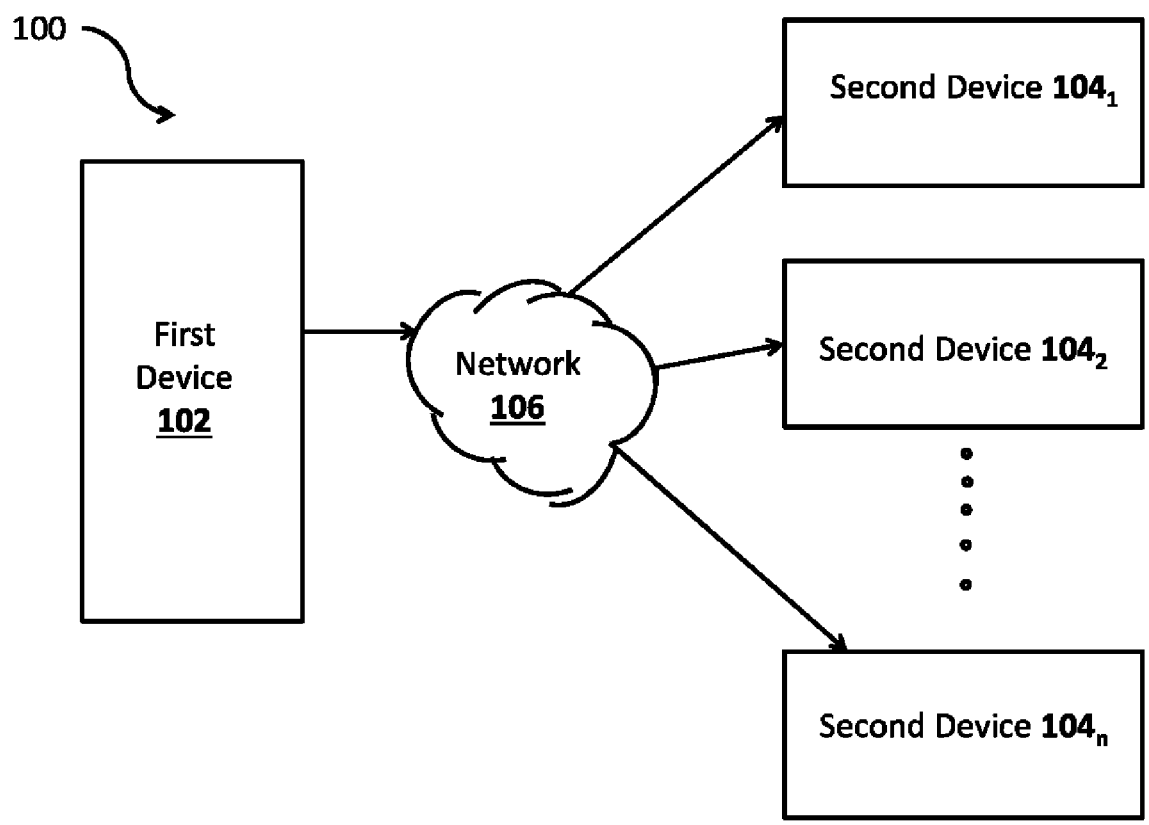
FIG. 1 depicts an Internet of Things (IoT) comprising a first device and one or more second devices.

Further, skilled artisans will appreciate that elements in the drawings are illustrated for simplicity and may not have been necessarily been drawn to scale. For example, the flow charts! flow diagrams illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises ... a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this invention belongs. The system, methods, and examples provided herein are illustrative only and not intended to be limiting.

Embodiments of the present invention will be described below in detail with reference to the accompanying drawings.

FIG. 1 depicts the Internet of Things (IoT) 100 comprising a first device 102 connectable to one or more second devices $104_{1...n}$ through a network 106 or Internet or short range wireless communication methods like WiFi, Bluetooth, ZigBee, or Infrared transmission, a serial connection or any means of wired or wireless connection. The network 106 comprises a master and peripheral type of connection between the first device and each of the one or more second devices $104_{1...n}$. The first device 102 is preferably a portable device, such as a mobile device, having a graphical user interface (GUI) and is carried in person by a user, and each of the one or more second devices $104_{1...n}$ is preferably smart device, and more preferably a smart wearable device. The network 106 may for example be a radio network providing a short range, preferably between about 10 m-100 m, and more preferably up to 30 m of the first device 102 and the one or more second devices $104_{1...n}$ to connect with each other. Most of these smart devices need to connect to a portable device having graphical user interface (GUI) such as a smart phone, to make use of complete set of features of the smart device. Some of the common form factors include watches and wristbands. Examples of smart devices may include, but not limited to, a smart watch, smart fitness bands, smart shoes, smart glass, smart earphones! headphones, smart clothing, smart jewellery to name a few.

Figure 2:
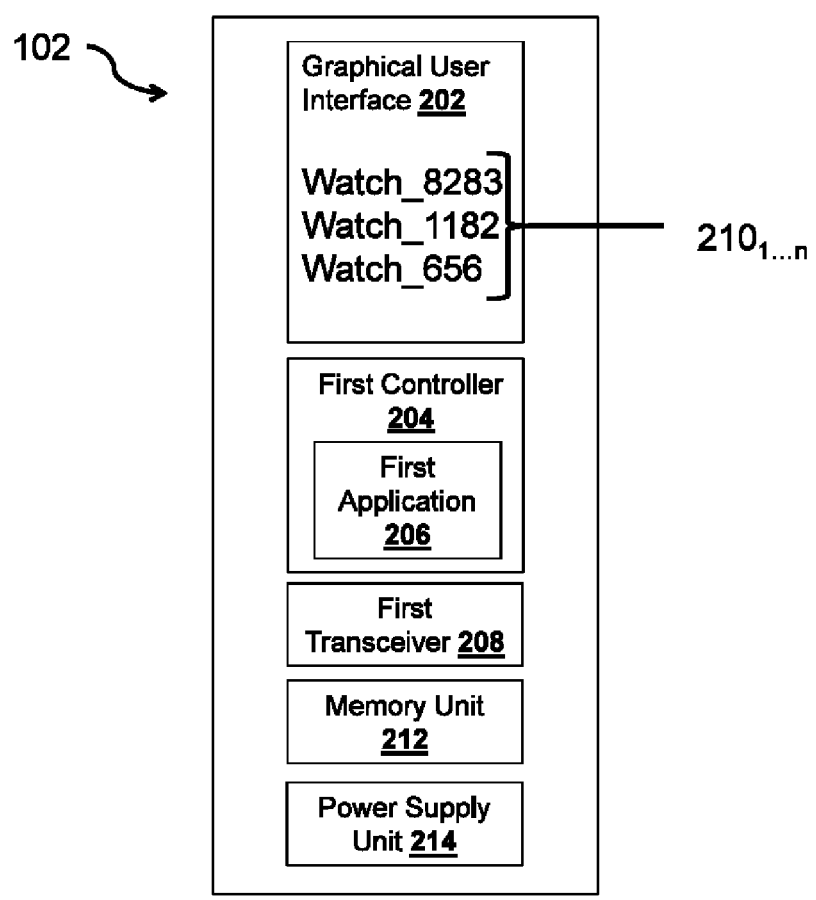
FIG. 2 depicts a block diagram of a first device displaying one or more connectable second devices within the IoT.

FIG. 2 depicts a block diagram of a first device 102 displaying one or more connectable second devices within the IoT. The first device 102 is a master device and may be a mobile phone, a tablet etc. having the Graphical user interface (GUI) 202, a first controller 204, a first application 206 running on the first controller 204 and a first transceiver 208 for connecting and communicating through the network 106 with the one or more second devices 104. The GUI 202 displays one or more graphics $210_{1...n}$ corresponding to the one or more second devices $104_{1...n}$, which are a part of the IoT 100.

The GUI 202 displays one or more graphics $210_{1...n}$ corresponding to the one or more second devices $104_{1...n}$, which are in communicative range of the first device 102 and further connected to the first device 102. Further, the graphic may be a text string, for example as shown in FIG. 2 "Watch_8283" or an image depicting a form of second device such as watch. The text string may include the form/type of the second device along with model number. The text string may include the default name of the smart device or name as set by the device owner. The first device 102 also includes a memory unit 212 for storing data captured by various sensors. The commands for the operation of the first device are pre-programmed in memory unit 212. A power supply unit 214, including a battery, is provided for supplying power to various modules/units of the first device 102.

Figure 3:
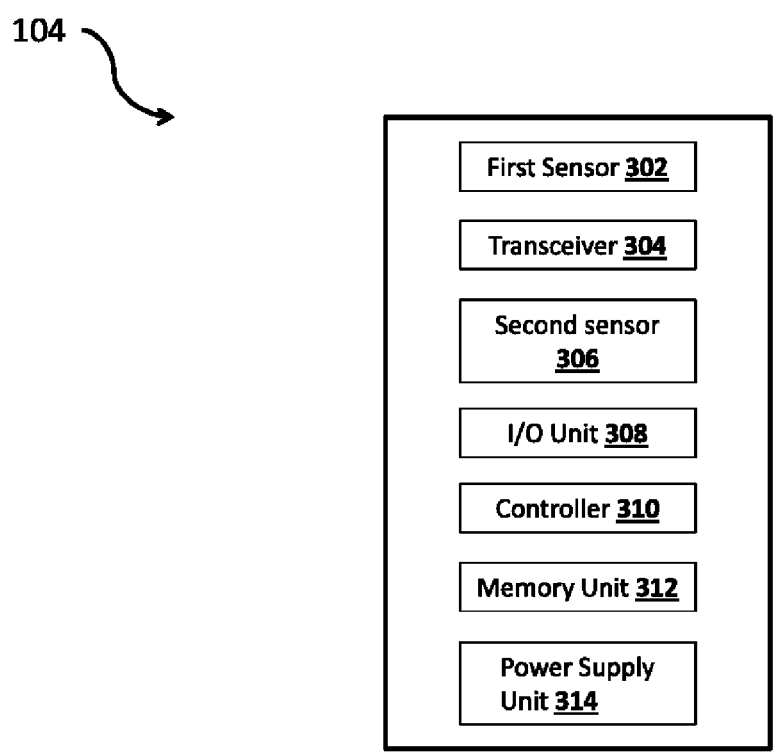
FIG. 3 depicts a block diagram of one or more second devices having same or similar form factor that are connectable to the first device within the IoT.

FIG. 3 depicts a block diagram of one or more second devices having same or similar form factor that are connectable to the first device within the IoT 100. Each of the one or more second devices $104_{1 \ldots n}$ (collectively referred to as 104) or smart devices includes a first sensor 302 such as accelerometers, location sensors for example GPS, stepcounters, blood pressure sensors, heart rate sensors among others which capture various types of data associated with the user. This data is communicated through a transceiver 304 to the first device 102 for further processing when the first device 102 and the one or more second devices 104 are connected with authorization to exchange data. Further, the one or more second devices 104 comprise a second sensor 306 for sensing user selection input, received via an I/O unit 308, which is captured by a controller 310 and transmitted by the transceiver 304. The second sensor 306 may, for example be a touch sensing device, a push button on a top surface or side of the wearable smart device, a biometric device, a gesture sensing device, a movement sensing device, a light sensing device or a sound sensing device among others. The user selection effects a change in voltage or current, which is captured by the controller 310 working in operational interconnection with the second sensor 306. Each of the one or more second devices 104 also include a memory unit 312 for storing data captured by various sensors. The commands for the operation of the each of the second devices 104 are pre-programmed in their respective memory unit 312. The one or more second devices 104 further include a power supply unit 314, comprising a battery for supplying power to various modules/units of the one or more second devices 104.

Figure 4:
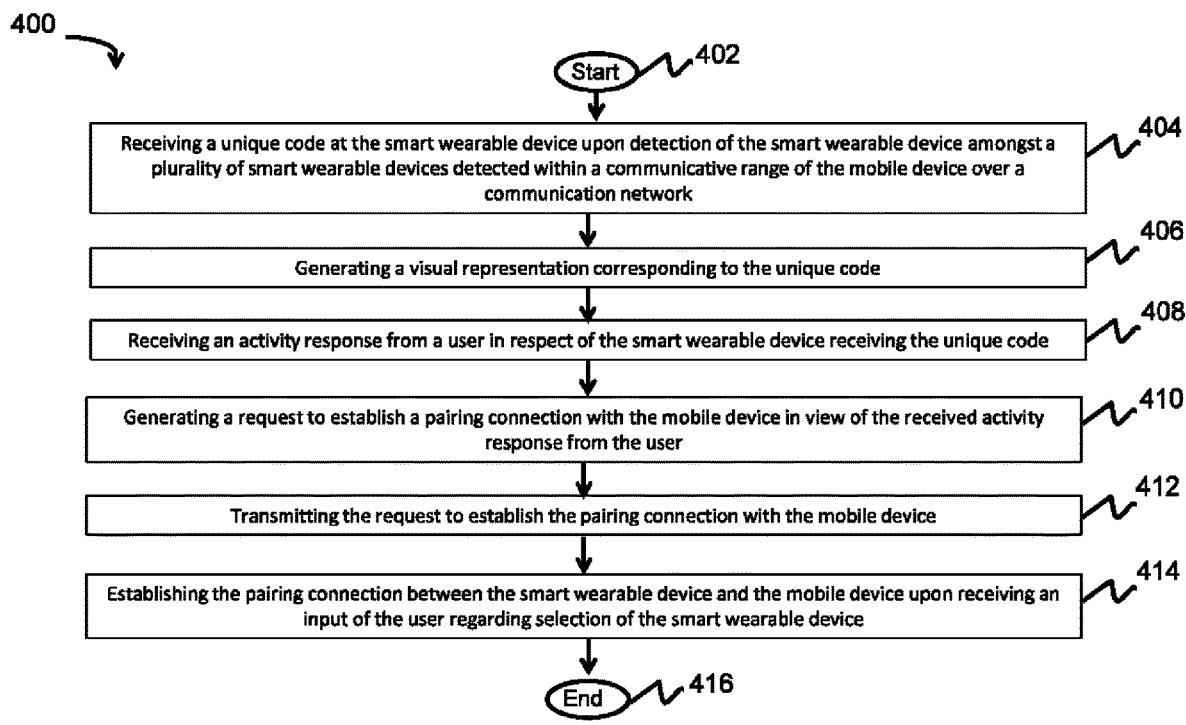
FIG. 4 depicts a flow diagram illustrating a method for establishing a pairing between a mobile device and a smart wearable device in accordance with an embodiment of the present invention.

Referring to FIG. 4, a flow diagram illustrating a method for establishing a pairing between a mobile device and a smart wearable device (smart device) in accordance with an embodiment of the present invention is provided. The method 400 starts at 402. At step 404, a unique code at the smart wearable device is received upon detection of the smart wearable device (second device 104) amongst a plurality of smart wearable devices detected within a communicative range of the mobile device (i.e. first device 102) over a communication network (106). In an embodiment, the unique code may be generated at random by the mobile device or may be defined by the user of the mobile device. Further, the unique code may be in one or more of numeric, alphanumeric or graphical representation form or any combination thereof. In an implementation, the unique code may be generated based on the type/form of smart wearable device. The method 400 further includes step 406 of generating a visual representation on the smart wearable device corresponding to the unique code, wherein the unique code facilitates in selection of the smart wearable device amongst the plurality of smart wearable devices detected within the communicative range of the mobile device over the communication network. The visual representation on the smart wearable device may be indicated in a digital form, for instance on a digital display device, or in a non-digital form, for instance using mechanical components (hands/arms) of a non-digital smart wearable device (analog smart watch). An activity response is received from a user in respect of the smart wearable device receiving the unique code and a request to establish a pairing connection with the mobile device in view of the received activity response from the user as shown in steps 408 and 410 respectively. The activity response of the user in respect of the smart wearable device may include one or more of a touch sensitive input, and a gesture-based input of the user. The generated request is transmitted in step 412 to establish the pairing connection with the mobile device. The request to establish the pairing connection includes the received unique code that facilitates in identification of the smart wearable device in a list of plurality of detected smart wearable devices displayed on the mobile device. The pairing connection is thereafter established in step 414 between the smart wearable device and the mobile device upon receiving an input of the user regarding selection of the smart wearable device, linked with the unique code as included in the request, from the list of the plurality of detected smart wearable devices displayed on the mobile device. The method ends at step 416.

In an embodiment, step 404 of generating the visual representation on smart wearable device corresponding to the unique code includes, sending a request to generate the visual representation corresponding to the unique code to a display unit of a digital smart wearable device; and generating the visual representation indicating the unique code on to a display interface disposed of the display unit.

In an embodiment, step 404 of generating the visual representation corresponding to the unique code includes actuating a first motor to control movement of a first arm (hand) of the smart wearable device, wherein the smart wearable device is a non-digital (analog) watch; and actuating a second motor to control movement of a second arm (hand) of the smart wearable device, wherein positions of the first arm and the second arm either alone or jointly generate the visual representation indicating the unique code. In an implementation, the first arm is an hour hand and the second arm is a minute hand of the smart wearable device. For instance, if the unique code is "12", the first arm may be actuated to move to number "1" in the analog watch (representing 1'o clock) and the second arm may be actuated to move to number "2" (representing 2'o clock). In the above example, the hour arm represents 10's column (that is numeral '1') and minute arm represents 1's column (that is numeral '2'). In an embodiment, the arms may represent any of the numerical column. In an implementation, only a single arm may be used to represent a unique code. In another example, if the unique code is 12, the same may be represented by actuating only the first arm to move to number 12 (representing 12'o clock). Different combinations of the arms may be used to represent the unique code. It is to be noted that the term first arm and second arm may be used in conjunction to represent any other arms present in the smart wearable device. Any additional arms, for instance seconds arm, chronographs arm etc., present in the smart wearable device may be actuated, alone or jointly along with first arm and/or second arm, for generating the visual representation indicating the unique code. In an embodiment, a third arm of smart wearable device, which is a second hand is also used to indicate a unique code, wherein, the combination of hour, minute and second arm jointly represent a three-digit unique code.

In an exemplary implementation, assuming there are four analog smart watches (smart wearable device), and the user would like to connect to one of the analog smart watch. By default, the mobile device and smart wearable devices (in this case, the smart devices are smart watches), are automatically connected. The mobile device, having a mobile application, is capable of generating and sending a unique code to each of the smart watch. Each of the smart watch may display the code through the arms (needles, both hour hand or minute hand or second hand or both). For example, four watches may have codes such as 1, 2, 3 and 4. Each code is sent to each of the smart watch. The first smart watch receiving code 1, shall display the time as 1 (the arms of smart watch is automatically positioned to show the time as 1 O'clock). In the similar way, the smart watch which receives code 2 shall display 2 O'clock, third watch shall display 3 O'clock and fourth watch shall display 4 O'clock. In an embodiment, the smart watch shall display the time (1 O'clock or 2 O'clock) at least for few minutes. Further, if user would like to connect to second watch, then user will pick that watch showing 2 O'clock, and user shall select the second watch (which is showing code 2) in the mobile device, then user connects and pairs to that second watch, and all other watches which are already connected, are automatically disconnected from the mobile device. In an embodiment, the mobile device may generate codes from 1 to 99. The smart watch is capable of actuating the arms (hour hand, minute hand or second hand) of the watch, to represent the subject code through simultaneously activating one or more arms of the watch and positioning at a right place (displaying the subject code).

In an implementation, the method 400 may be used to generate an un-pairing request (pairing disconnect request). The method 400 may include step of receiving the un-pairing request from the at least one smart wearable device and disconnecting the pairing of at least one smart wearable device with the mobile device. The un-pairing request may be generated in response to an activity of the user in respect of the at least one smart wearable device to be disconnected.

In an embodiment, the communication network comprises at least one of: a Bluetooth, a ZigBee, an Infrared transmission network, a WiFi, USB, a serial connection or any means of wired or wireless connection. The communication network includes a master and peripheral type of connection between the mobile device and each of the plurality of smart wearable device.

In an embodiment, the method 400 includes generating at least one exclusive code (unique code) for the subject smart wearable device other than device name (or model number) and device type. The exclusive code may be one of numeric, alpha numeric or graphical or any combination thereof. The exclusive code is being generated by an action of the user. The actions may be one of shaking, tapping or rubbing the smart wearable device, in a particular manner. The said exclusive code is transmitted to the mobile device which is in the communicative range of the smart wearable device. The exclusive code is being displayed in the list. In another embodiment, the generated exclusive code is being displayed on the display of smart wearable device, for quick recognition of subject device by the user having the mobile device. The user views the exclusive code on smart device and list (in the mobile device) and immediately selects and pairs with the subject smart wearable device.

In an implementation, the unique code may be generated at random or may be defined by the user. The unique code may be in one or more of numeric, alphanumeric or graphical representation form or any combination thereof. In case of analog smart wearable devices, the unique is preferably numeric in character. In an implementation, the unique code may be a unique colour code. In such a case, the unique colour code facilitates in selection of the smart wearable device amongst the plurality of smart wearable devices detected within the communicative range of the mobile device over the communication network. The unique colour code may be shown using a glowing LED or any suitable colour indicating means.

Figure 5:
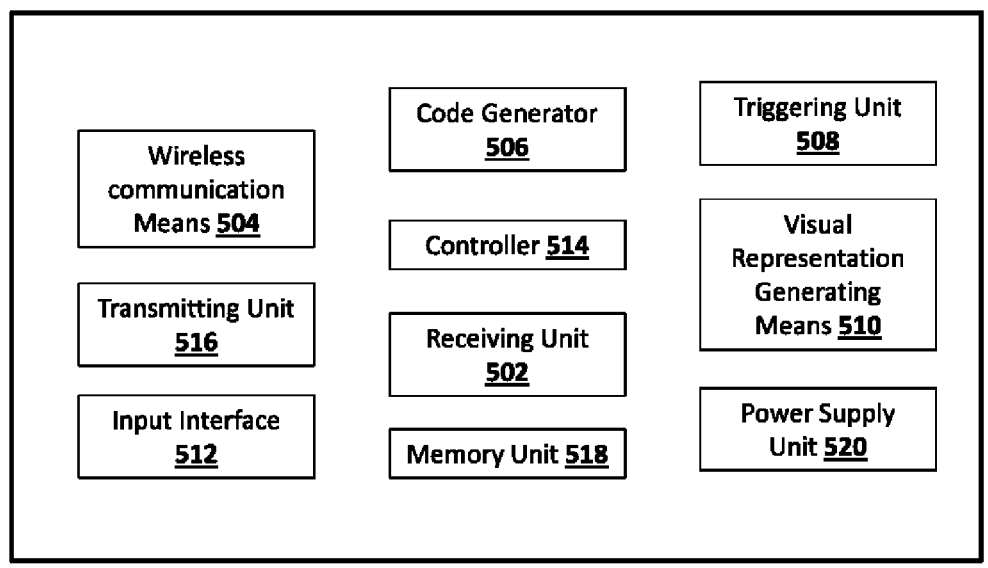
FIG. 5 depicts a block diagram of an apparatus for establishing a pairing between a mobile device and a smart wearable device in accordance with an embodiment of the present invention.

Referring to FIG. 5, a block diagram of an apparatus for establishing a pairing between a mobile device and a smart wearable device in accordance with an embodiment of the present invention is illustrated. The apparatus 500 is configured to implement the method illustrated in FIG. 4. The apparatus 500 includes a receiving unit/receiver 502 for receiving a unique code at the smart wearable device upon detection of the smart wearable device amongst a plurality of smart wearable devices detected within a communicative range of the mobile device over a communication network. A wireless communication means 504 may be provided to send wireless radio wave signals to be detected by the mobile device. The communication network includes at least one of: a Bluetooth, a ZigBee, an Infrared transmission network, a WiFi, USB, a serial connection or any means of wired or wireless connection. The communication network may include a master and peripheral type of connection between the mobile device and each of the plurality of smart wearable devices.

In an embodiment, the mobile device is configured to include a code generator 506, which includes a suitable processing circuitry, for generating at least one exclusive code (unique code) for the smart wearable device other than device name (or model number) and device type. The exclusive code may be one of numeric, alpha numeric or graphical or any combination thereof. In an alternate embodiment, the apparatus is configured to include the code generator 506. The exclusive code may be generated by an action of the user. The actions may be one of shaking, tapping or rubbing the smart wearable device, in a particular manner.

Further, a triggering unit 508 is provided for triggering one or more visual representation generating means 510 for generating a visual representation corresponding to the unique code. The unique code facilitates in selection of the smart wearable device amongst the plurality of smart wearable devices detected within the communicative range of the mobile device over the communication network. The said one or more visual representation generating means 510 may include a processing circuitry controlling the display operations of a digital smart wearable device. For instance, the one or more visual representation generating means 510 may include a display processing circuitry, operationally interconnected to the display unit of the smart wearable device, configured to display a visual representation indicating the unique code on to a display interface of the display unit of the smart wearable device. The visual representation in such a case may be a digital display of the unique code on the display interface. In another implementation, the one or more visual representation generating means 510 may include one or more motors configured to control hands (arms) of an analog smart wearable (non-digital watch). The one or more visual representation generating means 510 may actuate a first motor to control movement of a first arm of the smart wearable device and actuate a second motor to control movement of a second arm of the smart wearable device, wherein positions of the first arm and the second arm either alone jointly generate the visual indicating the unique code.

An input interface 512 is provided for receiving an activity response from a user in respect of the smart wearable device receiving the unique code. The activity response of the user may include at least one of: a touch sensitive input, and a gesture-based input of the user. The user may shake the smart wearable device or press any button or touch the display of said smart wearable device. Suitable sensors including touch sensors, optical sensors, and motion sensors may be used to detect the activity response of the user. The touch sensitive input may include any user touch on any part of the smart wearable device. For instance, access of an application menu of the smart wearable device; or press of a button(s) may correspond to the activity response. The gesture-based input may include shaking, tapping, rubbing, holding of the smart wearable device. In some embodiments, gesture-based input includes, but not limited to: finger taps of various duration, swipes in various directions, and circles (clockwise or counter-clockwise) etc. The apparatus 500 further includes a controller 514 for generating a request to establish a pairing connection with the mobile device in view of the received activity response from the user. The controller 514 may further include one or more general processors, digital signal processors, application specific integrated circuits, field programmable gate arrays, servers, networks, digital circuits, analog circuits, combinations thereof, or other now known or later developed devices for generating a request to establish a pairing connection. The generated request is transmitted through a transmitting unit/transmitter 516, wherein the transmitted request to establish the pairing connection includes the received unique code that facilitates in identification of the smart wearable device in a list of plurality of detected smart wearable devices displayed on the mobile device. The wireless communication means 504 further establishes the pairing connection between the smart wearable device and the mobile device upon receiving an input of the user regarding selection of the smart wearable device, linked with the unique code as included contained in the request, from the list of the plurality of detected smart wearable devices displayed on the mobile device. The unique code is displayed in the list. In another embodiment, the unique code is displayed on the display of smart wearable device, for quick recognition of subject device by the user having the mobile device. The user views the unique code on smart wearable device and list (in the mobile device) and immediately pairs with the subject smart wearable device.

The apparatus 500 further includes a memory unit 518 for storing details to relating to the unique codes, log details of pairing and unpairing with the mobile device. The commands for the generating the pairing connection request, triggering the visual representation generating means 510 are pre-programmed in memory unit 518. The memory unit 518 may include but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory unit 518 includes a cache or random-access memory for the controller 514. In alternative examples, the memory unit 518 is separate from the controller 514, such as a cache memory of a processor, the system memory, or other memory. The memory unit 518 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory unit 518 is operable to store instructions executable by the controller 514. The actions, acts or tasks are independent of the particular type of instructions set, storage media, processor or processing strategy and may be performed by software, hardware, integrated circuits, firm-ware, microcode and the like, operating alone or in combination thereof. Likewise, processing strategies may include multiprocessing, multitasking, parallel processing and the like. A power supply unit 520 including a battery, is further provided for supplying power to various modules/units of the apparatus 500. The apparatus 500 described may be implemented by software programs executable by a computer system. Further, in a non-limited example, implementations can include distributed processing, component/object distributed processing, and parallel processing. Alternatively, virtual computer system processing can be constructed to implement various parts of the system. The apparatus 500 is not limited to operation with any particular standards and protocols. For example, standards for Internet and other packet switched network transmission (e.g., TCP/IP, UDP/IP, HTML and HTTP) may be used. Such standards are periodically superseded by faster or more efficient equivalents having essentially the same actions. Accordingly, replacement standards and protocols having the same or similar actions as those disclosed are considered equivalents thereof.

Figure 6:
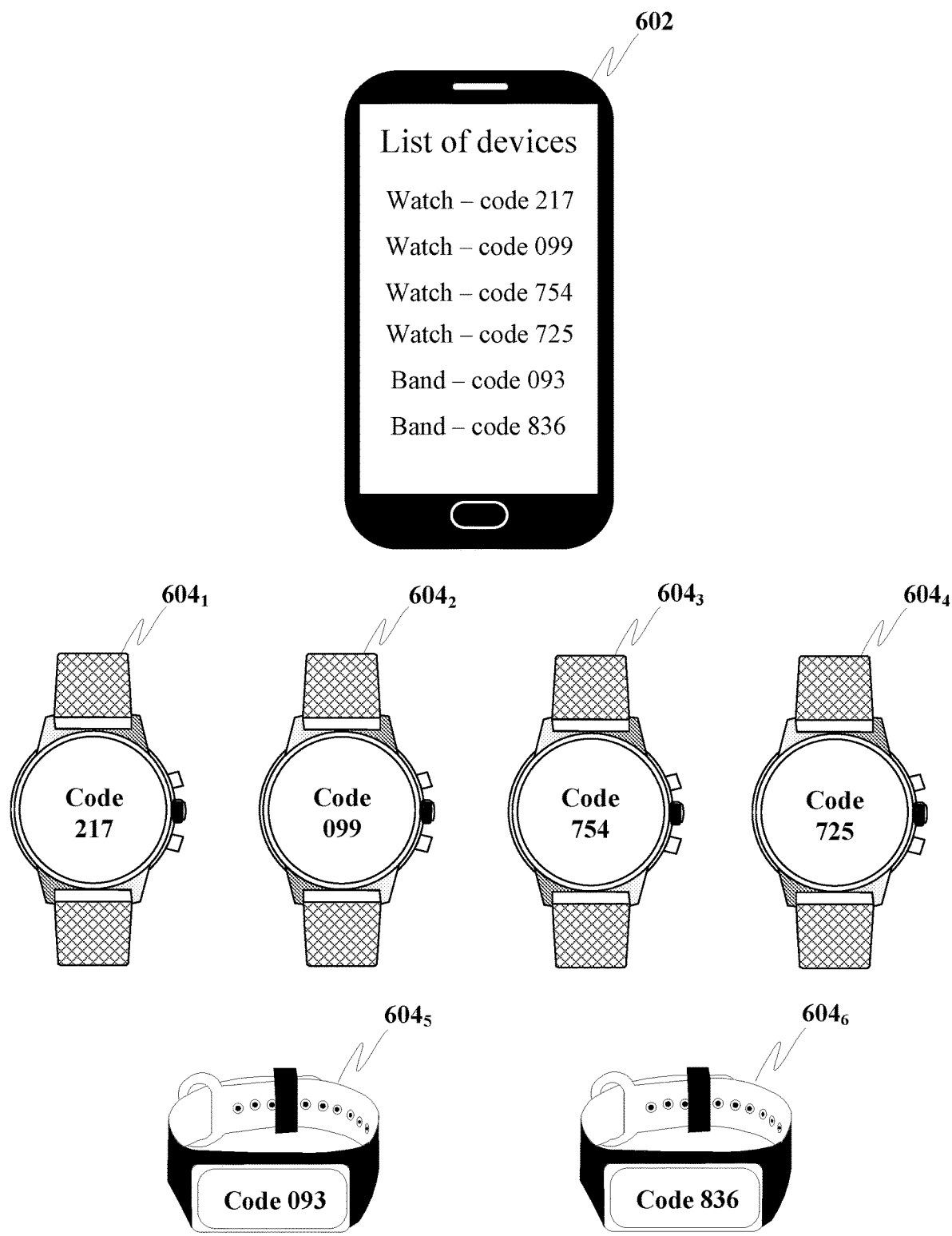
FIG. 6 depicts an environment illustrating the mobile device displaying the unique codes assigned to detected smart devices.

Referring to FIG. 6, an environment illustrating the mobile device displaying the unique codes assigned to detected smart devices is provided. Assuming the mobile device 602 detects 6 smart devices. Amongst the six smart devices, four smart devices are smart watches $604_1$, $604_2$, $604_3$, $604_4$ and two are smart fitness bands $604_5$ and $604_6$. The mobile device 602 includes a display screen that displays the list (first type of information) of detected devices along with their respective unique code. As can be noticed, the respective unique code of the smart devices as displayed on the display screen of the mobile device is also displayed on the display screen of the respective smart devices. For instance, the codes 217, 099, 754, 725 respectively corresponding to each of the smart watches $604_1$, $604_2$, $604_3$, $604_4$ as displayed on the display screen of the mobile device 602 and also displayed on the respective display screens of smart watches $604_1$, $604_2$, $604_3$, $604_4$. Similarly, the codes 093, 836 respectively corresponding to each of the smart fitness bands $604_5$ and $604_6$ are displayed on the displayed screen of the mobile device 602 and on the respective display screens of smart fitness bands watches $604_5$ and $604_6$. A comparison is made by the user between the code information from the mobile application (list) with that of each of the smart devices. A selection is made by the user with which the user wants to establish a pairing connection based on the comparison. The selection is made by at least one of: a touch sensitive input, and a gesture-based input of the user (on mobile device).

In an embodiment, the mobile device is capable of generating and sharing a unique code to all the smart devices which are in the communicative range. The mobile device having a display, further lists the unique codes transmitted to each of the plurality of smart devices.

Based on the selection, a connection is established between the mobile device and the selected smart device. Thus, because of the unique code, the user can immediately realize the difference between plurality of smart devices. It helps the user to connect faster and pair with the selected smart device. Advantageously, the method described herein enables selection and identification of a subset of one or more second devices! smart devices, including one or more second devices having same form factor. Also, the method enables first time pairing between the one or more second devices with the first device even in instances when the one or more second devices do not display a unique identifier. The method described herein is very intuitive, as easy as shake to connect and pair to a particular device. Also, as devices that are not in use are not connected to, there is significant power consumption and radio-wave decrease.

The method apparatus herein enables automatic connection between the one or more second devices and the first device. Accordingly, there is no need for the user to open the application corresponding to the second device and click on connect. In other words, the first device is always sensing for the one or more second devices that may need to connect and then automatically connects and pairs to the second device that indicates a change in the characteristic as described above. A simple, selection input such as shaking the second device is required to connect it to corresponding application on the first device. Similarly, for disconnecting, if the first device is connected to three of the second devices, the user can shake and disconnect anyone of them. Again, there is no need to access the corresponding application.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

We claim:

1. A method for establishing a pairing between a mobile device and a smart wearable device, the method comprising:
   receiving a unique code at the smart wearable device, wherein the unique code is generated at the mobile device upon detection of the smart wearable device amongst a plurality of smart wearable devices detected within a communicative range of the mobile device over a communication network;
   generating a visual representation corresponding to the unique code to facilitates in selection of the smart wearable device amongst the plurality of smart wearable devices detected within the communicative range of the mobile device over the communication network;
   receiving an activity response on the smart wearable device upon the display of the visual representation of the unique code;
   generating a request to establish a pairing connection with the mobile device in response to the activity response;
   transmitting the request for the pairing to the mobile device,
   wherein the request includes the received unique code; and
   establishing the pairing between the smart wearable device and the mobile device upon receiving an input representing selection of the smart wearable device linked with the unique code, from the list of the plurality of detected smart wearable devices displayed on the mobile device,
   wherein said generating the visual representation corresponding to the unique code comprising actuating a first motor to control movement of a first arm and actuating a second motor to control movement of a second arm of the smart wearable device, wherein the alignment of the first arm and the second arm either alone or jointly generate the visual representation indicating the unique code.

2. The method as claimed in claim 1, wherein generating the visual representation corresponding to the unique code comprising:
   sending a request to generate the visual representation corresponding to the unique code to a display unit of the smart wearable device; and
   generating the visual representation indicating the unique code on a display interface disposed of the display unit.

3. The method as claimed in claim 1, wherein the first arm is an hour hand and the second arm is a minute hand of the smart wearable device primarily operative to show time in the non-digital form.

4. The method as claimed in claim 1, further comprising:
   receiving an un-pairing request from the smart wearable device, wherein the un-pairing request is generated in response to a second activity on the smart wearable device indicative of the un-pairing request to; and
   un-pairing the smart wearable device with the mobile device.

5. The method as claimed in claim 1, wherein the activity response of the user in respect of the smart wearable device comprises at least one of: a touch sensitive input, and a gesture-based input.

6. The method as claimed in claim 1, wherein the communication network comprises a master and peripheral type of connection between the mobile device and each of the plurality of smart wearable device.

* * * * *